United States Patent [19]

Sfarti et al.

[11] Patent Number: 4,809,169
[45] Date of Patent: Feb. 28, 1989

[54] PARALLEL, MULTIPLE COPROCESSOR COMPUTER ARCHITECTURE HAVING PLURAL EXECUTION MODES

[75] Inventors: Adrian Sfarti, Sunnyvale; Achim Strupat, Irvine, both of Calif.

[73] Assignee: Advanced Micro Devices, Inc., Sunnyvale, Calif.

[21] Appl. No.: 855,224

[22] Filed: Apr. 23, 1986

[51] Int. Cl.[4] .................................... G06F 15/16
[52] U.S. Cl. ............................................ 364/200
[58] Field of Search ... 364/200 MS File, 900 MS File

[56] References Cited

U.S. PATENT DOCUMENTS

| | | | |
|---|---|---|---|
| 3,287,702 | 11/1966 | Borck, Jr. et al. | 364/200 |
| 3,979,728 | 9/1976 | Reddaway | 364/200 |
| 4,101,960 | 7/1978 | Stokes et al. | 364/200 |
| 4,149,243 | 4/1979 | Wallis | 364/200 |
| 4,224,600 | 9/1980 | Sellner | 364/200 X |
| 4,365,292 | 12/1982 | Barnes et al. | 364/200 |
| 4,435,758 | 3/1984 | Lorie et al. | 364/200 |
| 4,498,134 | 2/1985 | Hansen et al. | 364/200 |
| 4,514,807 | 4/1985 | Nogi et al. | 364/200 |
| 4,542,455 | 9/1985 | Demeure | 364/200 |
| 4,709,327 | 11/1987 | Hillis et al. | 364/200 |

*Primary Examiner*—Raulfe B. Zache
*Assistant Examiner*—Florin Munteanu

*Attorney, Agent, or Firm*—Fliesler, Dubb, Meyer & Lovejoy

[57] ABSTRACT

A coprocessor architecture specifically adapted for parallel operation as one of an array of coprocessors is described. Each of the coprocessors of the array are commonly responsive to a host processor. The coprocessor architecture preferably includes a selector for enabling the responsiveness of the coprocessor architecture to instructions from the host processor including an enabled responsiveness unique among the plurality of coprocessors and enabled responsiveness that is in common with that of the plurality of the coprocessors. The coprocessor architecture further includes a microengine for qualifying the responsiveness of the coprocessor to instructions provided by the host processor including qualification of the enabled responsiveness of the coprocessor architecture as provided for by the selector. Consequently, the coprocessors of the array are readily managed both individually and, from the perspective of the host processor, as a single entity operating as a single instruction, multiple data machine. As such, the coprocessor array requires little, if any, managerial support from the host processor, regardless of the specific number of coprocessors participating in the coprocessor array.

28 Claims, 4 Drawing Sheets

PARALLEL, MULTIPLE COPROCESSOR COMPUTER ARCHITECTURE HAVING PLURAL EXECUTION MODES

BACKGROUND OF THE INVENTION

1. Field of the Invention.

The present invention generally relates to computer architectures that employ coprocessors closely coupled to a host processor and, in particular, to a coprocessor architecture that allows multiple coprocessors to be functionally configured to selectably implement a highly parallel single instruction, multiple data machine by the utilization of close inter-coprocessor coupling to obtain concurrency in operations on respective coprocessor data.

2. Description of the Related Art.

Computer coprocessors are utilized in a wide variety of computer systems, though typically in conjunction with micro, super-micro, mini and super-mini computer systems, to implement an equally varied number of fairly specific functions. Typically, the specific functions performed by these coprocessors are closely tailored or dedicated to a particular type of operation, such as servicing a particular end device, while presenting a very high level interface to the host processor of the computer system. Typically, the dedicated functions supported by coprocessors include direct hardware supported numerical data computations, support of a specific high-level communications network and management of high speed data channels further in support of, perhaps, other dedicated coprocessors.

Conventionally, each coprocessor within a computer system is a largely separate entity particularly from the perspective of the host processor. That is, each high level function of the various coprocessors within a computer system must be separately initiated, and where required, specifically managed by the host processor itself. Consequently, the host processor is significantly burdened since it is required to effectively function as the primary communication conduit between coprocessors performing interdependent tasks or functions.

With the advent of coprocessors, an immediate and continuing desire has been to increase their respective performance in executing their corresponding dedicated functions. However, coprocessors are typically fully defined chip-level devices. Therefore, specific aspects of their design are rigorously set from the outset. Fixed bus width and maximum processing speeds results in a hard limit on the performance of the coprocessor. This, in turn, leads to the necessary development of subsequent generations of coprocessors to provide incremental improvements over the previous generation coprocessors. However, the hard upper limit on the processing performance of each coprocessor remains fixed for its generation, regardless of its generation of development.

A somewhat simplistic appearing alternative to awaiting subsequent coprocessor generations is to utilize several coprocessors in parallel. There are, however, a number of rather fundamental difficulties in a realizing any significant performance gain in this manner. Each coprocessor is an integral, functionally complete unit and, therefore, not readily adaptable to truly parallel operation. Consequently, execution of the function requested of paralleled coprocessors cannot be efficiently performed unless the function is conveniently partitionable to independent, parallel subfunctions in number equaling or less than the number of paralleled coprocessors.

Another problem with the simple paralleling of conventional coprocessors is that the nominally minimum initialization and any subsequent management functions performed by the host processor increases in at least direct proportion to the increased number of the coprocessors utilized. Indeed, the burden on the host processor likely increases at a greater than linear rate due to the increasing complexity of the initialization and management functions required of the host processor due to the increasing number of the coprocessors.

The foregoing problems are substantially compounded in any application where the paralleled coprocessors are performing processes that are in any way interdependent. For example, if a single end result is required from the function performed globally by conventional, paralleled coprocessors, the host processor is required to collect the respective interim process results from the paralleled coprocessors and distribute it globally at each processing step where a final result might be obtained. Further, if the execution timing of the paralleled coprocessors is in any way data dependent, the host processor is further burdened with the responsibility of ensuring that the paralleled coprocessors ar synchronized for contributing properly corresponding interim results.

Alternately, the data dependent execution speed of the paralleled coprocessors might be masked by the enforced treatment of all data dependent execution operations as occurring at their worst case execution speed. Such an enforced lock-step execution would relieve the host processor of a substantial coprocessor management burden. However, the typically wide variance in actual to worst-case execution speed would result in a corresponding loss in the possible net performance gain obtained through the utilization of paralleled coprocessors participating in the performance of a single dedicated function.

SUMMARY OF THE INVENTION

Therefore, a purpose of the present invention is to provide a coprocessor architecture particularly suited for use in a multiple, parallel coprocessor architecture configuration while requiring little, if any, additional initialization and managerial processing participation by the host processor.

This is accomplished in the present invention by the provision of a coprocessor architecture specifically adapted for parallel operation among a plurality of such coprocessors, where each coprocessor is responsive to a common host processor. The coprocessor architecture preferably includes a selector means for enabling the responsiveness of the coprocessor architecture to instructions from the host processor including an enabled responsiveness unique among the plurality of coprocessors and an enabled responsiveness that is in common with that of the plurality of the coprocessors. Preferably, the coprocessor architecture further includes a microengine means for qualifying the responsiveness of the coprocessor to instructions provided by the host processor including qualification of the enabled responsiveness of the coprocessor architecture as provided for by the enabling means.

Thus, an advantage of the present invention is that it achieves the ability to operate both individually and in parallel with other coprocessors in the performance of a dedicated coprocessor function.

Another advantage of the present invention is that it provides for the operation of an array of like coprocessors as a single instruction, multiple data machine, thereby allowing wide flexibility in the specific configuration and maximum execution performance achievable jointly by the array. The manner of selecting either single instruction, multiple data or multiple instruction, multiple data modes of operation is reduced by way of the present invention to a very low-level task quite easily performed by the host processor.

A further advantage of the present invention is that it fully accommodates the execution of data dependent operations when executing a single instruction, multiple data function. This is achieved in the present invention without requiring any intervention or direct participation by the host processor. Data dependent operations are performed by the coprocessor architecture at an effective maximum speed corresponding to the longest actual execution period required by any of the coprocessors for the respective actual data processed. Consequently, instruction synchronization is maintained by the present invention while execution proceeds in the paralleled coprocessors at a jointly maximum rate.

Still another advantage of the present invention is that it provides for the coprocessor wide, or global, exchange of corresponding interim results at decision points during the execution of an instruction. This too is achieved in the present invention without any intervention or managerial participation by the host processor.

A still further advantage of the present invention is that it implements a global prioritization scheme to coordinate the execution of dedicated subfunctions of the multiple parallel coprocessor architecture. Additionally, the prioritization scheme of the present invention specifically allows the participation of other devices of the computer system, including conventional coprocessors and the host processor itself, in obtaining priority access to the resources nominally managed by the multiple parallel coprocessor architecture.

BRIEF DESCRIPTION OF THE DRAWINGS

These and other attendant advantages and further features of the present invention will become apparent and better understood by reference to the following detailed description of the invention particularly when considered in conjunction with the accompanying drawings, wherein like reference numerals designate like parts throughout the figures thereof, and wherein.

DETAILED DESCRIPTION OF THE INVENTION

Figure 1:
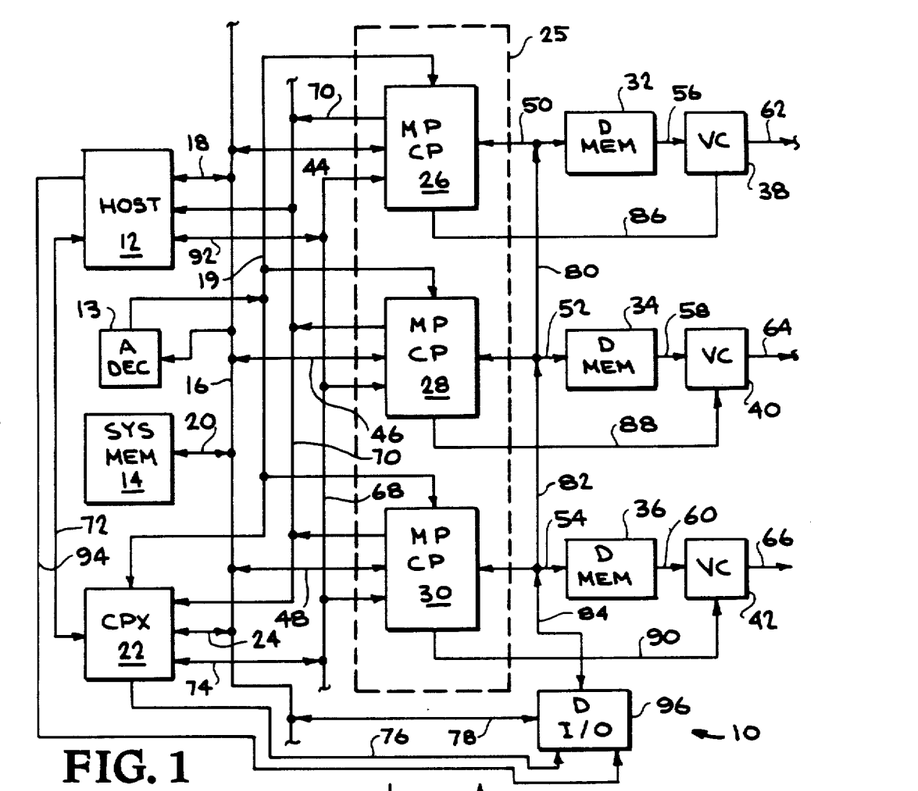
FIG. 1 is a simplified block diagram of a computer system including a paralleled coprocessor array utilizing a coprocessor architecture in accordance with a preferred embodiment of the present invention.

A computer system, generally indicated by the reference numeral 10 and utilizing a number of coprocessors paralleled in accordance with the present invention, is shown in FIG. 1. The computer system 10 preferably includes a host processor 12 coupled to a system bus 16 via a host interface bus 18 for the transfer of control, address and data signals. A system memory 14 is similarly coupled to the system bus 16 by a system memory interface bus 20. In accordance with the present invention, multiple paralleled coprocessors (MPCP) 26, 28, 30 are also respectively coupled to the system bus 16. Together, these coprocessors form a multiple, parallel coprocessor architecture array 25.

A substantially conventional coprocessor (CPX) 22 is provided to perform a dedicated function such as direct memory address control. Accordingly, the conventional coprocessor 22 is coupled to the system bus 16 via a DMA interface bus 24 and directly to the host processor 12 via interrupt request and acknowledge control lines 72. In accordance with a preferred embodiment of the present invention, the conventional DMA coprocessor 22 is preferably configured to provide address and control signals to a direct I/O channel buffer 96 via a control line 76. Thus, data corresponding to specific addresses selected by the conventional DMA coprocessor 22 may be transferred between the system memory 14 and the direct I/O channel buffer 96 via the system bus 16 and a direct I/O data channel interface bus 78.

In a preferred embodiment of the present invention, the multiple parallel coprocessors of the array 25 provides for high level, graphics oriented management of respective sets of video display memory planes and, further, for providing various display memory and video control functions associated with the presentation of a video graphic data stream. Thus, in accordance with the present invention, the multiple parallel coprocessors, 26, 28, 30 are coupled by respective display control, address and data busses 50, 52, 54 to respective display memory buffers 32, 34, 36. The display buffers 32, 34, 36 each preferably provide four display memory bit planes for the storage of graphics and display information. The bit planes of the display memories 32, 34, 36 are, in turn, preferably connected to respective video circuit 38, 40, 42 by video memory data busses, 56, 58, 60. The video circuits 38, 40, 42 preferably include control circuitry, such as data serializers, color palettes, and digital to analog converters, as desired to provide respective video data streams on the video circuit output lines 62, 64, 66. The selection and control of the various functions present within the video circuits 38, 40, 42 is preferably selected by the respectively associated multiple parallel coprocessor 26, 28, 30 via the provision of control signals on the respective video circuit control lines 86, 88, 90.

In accordance with the present invention, the multiple parallel coprocessors 26, 28, 30 are closely interconnected for sharing control information regarding the synchronized execution of data dependent operations, corresponding interim or parallel partial results, synchronized performance of prioritized subfunctions, synchronized admittance of an external device to access other devices nominally managed exclusively by coprocessor array 25 and common synchronization to an external timing source. Specifically, the multiple parallel coprocessors 26, 28, 30 effectively share a control bus 68 for communicating directly among themselves substantially independent of the host processor 12. However, other devices, such as the host processor 12 and the conventional coprocessor 22, may be coupled to the communication bus 68 specifically for providing requests to access the display memory 32, 34, 36. Grant of an external device request is acknowledged in unison by the multiple parallel coprocessors 26, 28, 30 by provision of an acknowledge status signal on an acknowledge control line 70. Once an external device is granted access, the direct I/O data channel buffer 96 becomes a gateway for data operations directly on the devices attached to and nominally managed by the coprocessor array 25, while the individual multiple parallel coprocessors 26, 28, 30 remain largely idle.

The preferred nominal mode of operation of the present invention, however, only utilizes the host processor 12 to provide a high level instruction and related data to each of the multiple parallel coprocessor array 25 via the system bus 16 and coprocessor instruction data busses 44, 46, 48. In order to minimize the processing burden on the host processor in distributing the various instructions and data, the present invention provides for two basic host selectable modes of instruction transfer operation. An address decoder 13 is preferably provided coupled to the address lines of the system bus 16 to provide respective chip select control signals to the multiple parallel. coprocessors 26, 28, 30. Thus, as indicated in Table I, a host processor 12 memory access operation directed to an address recognized by the address decoder 13 results in the generation of a corresponding chip select signal In accordance with a preferred embodiment of the present invention, a write operation directed to an address $A_6$ of binary one and $A_{5-2}$ of binary zero, the address decoder 13 preferably provides respective chip select signals simultaneously to each of the multiple parallel coprocessors 26, 28, 30.

TABLE I

| $A_6$ | $A_5$ | $A_4$ | $A_3$ | $A_2$ | R/W | Mode |
|---|---|---|---|---|---|---|
| 1 | 0 | 0 | 0 | 0 | 1 | Broadcast Write |
| 1 | 0 | 0 | 0 | 0 | 0 | Broadcast Read |
| 1 | 0 | 0 | 0 | 1 | 1 | Write MPCP #1 |
| 1 | 0 | 0 | 0 | 1 | 0 | Read MPCP #1 |
| 1 | 0 | 0 | 1 | 0 | 1 | Write MPCP #2 |
| 1 | 0 | 0 | 1 | 0 | 0 | Read MPCP #2 |
| 1 | | n | | | 1 | Write MPCP #n |
| 1 | | n | | | 0 | Read MPCP #n |
| 0 | X | X | X | X | X | No Coprocessor Access |

As a result, the instruction and data provided by the host processor 12 is simultaneously broadcast and received by all of the coprocessors 26, 28, 30 of the array 25. Thus, where the multiple parallel coprocessors 26, 28, 30 are to perform the same sequences of instructions, the burden on the host processor 12 in sourcing those instructions and data is fully independent of the number of multiple parallel coprocessors 26, 28, 30 present within the array 25.

If, instead, a broadcast read operation is performed, in accordance with a preferred embodiment of the invention, each of the mutltiple parallel coprocessors of the array 25 provide a respectively corresponding portion of a composite data word to be effectively read by the host processor 12. That is, in a preferred embodiment of the present invention, each four memory planes, as associated with respective coprocessors of the array 25, are logically stacked such that each pixel includes a positionally corresponding bit in each memory plane. In response to a broadcast read operation, each coprocessor may just provide four bits of a preselected pixel to the host processor 12 in parallel with respective sets of four bits from other coprocessors of the array 25. Consequently, the array 25 can provide a complete pixel data word to the host in response to a single read operation.

Where it is necessary to provide or obtain individualized information and data with regard to any specific one of the multiple parallel coprocessors of the array 25, in accordance with the present invention, the host processor 12 selects a unique multiple parallel coprocessor mode of addressing by merely directing its access operation against the address of the specifically chosen multiple parallel coprocessor.

Figure 2:
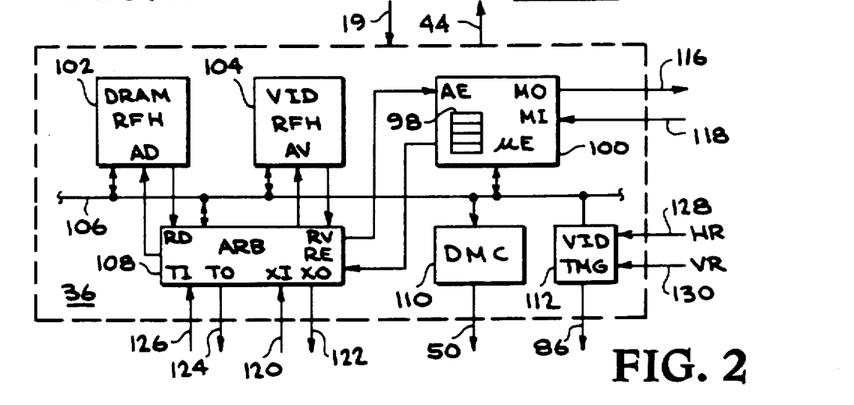
FIG. 2 is a block diagram of a coprocessor architecture constructed in accordance with a preferred embodiment of the present invention.

The significant architectural blocks of a multiple parallel coprocessor 26, as constructed in accordance with a preferred embodiment of the present invention, are shown in FIG. 2. The principle block is a micro-engine 100. Preferably, the micro-engine 100 is a micro-coded sequencer that operates specifically to implement the high level instructions provided by the host processor 12. The micro-engine 100 includes or is intimately associated with a number of data storage registers 98 for storing configuration and operation defining data. The instructions and their corresponding data are preferably provided onto an internal instruction and data bus 106 from the instruction and data interface bus 44. Actual transfer of specific instructions and data from the instruction and data bus 44 to the internal instruction and data bus 106 is qualified for each multiple parallel coprocessor 26 by the presence or the absence of its corresponding chip select control signal as provided on its respective chip select line $19_1$.

Preferably, the data stored by the data storage registers 98 is used to further qualify the operation of the micro-engine 100 upon micro-engine receipt of instructions and data. In accordance with the preferred embodiment of the present invention, one register of the data storage registers 98 is utilized to store an array position code. Preferably, this position code is assigned directly in response to the receipt of a host instruction. A "Set Position" instruction is preferably realized as a single 16 bit instruction word having an instruction unique operand at instruction bits $I_{6-0}$ and a position code at instruction bits $I_{15-10}$. Upon receipt of this instruction, the micro-engine 100 copies the position code into a position code register (QPR) $98_1$. Since each multiple parallel coprocessor of the array 25 is assigned a unique position code, the "Set Position" instruction is individually issued by the host processor 12 to each of the multiple parallel coprocessors 26, 28, 30.

In the preferred embodiment of the present invention, another of the registers 98 is preferably utilized to store four activity status bits to respectively define the activity status of its associated four display memory bit planes. The activity status bits allow instructions directed generally against all four display memory planes to be specifically disregarded with respect to any display memory plane whose corresponding activity status bit is reset to zero, i.e. is inactive. That is, on receipt of an instruction, the micro-engine 100 checks the data stored in the activity status register (QSR) $98_2$ and then effectively executes the instruction only with respect to the display memory planes whose corresponding activity status bit is set by simply not writing the results of the instruction to the inactive memory planes.

Preferably, data is stored to the activity status register $98_2$ in response to a "Set Activity Bits" instruction. In accordance with the preferred embodiment of the present invention, the host processor 12 need not individually address each coprocessor of the array 25. Instead, the activity status register $98_2$ is set in up to four multiple parallel coprocessors 26 simultaneously by the issuance of a single instruction. This is achieved by utilizing an instruction having a position sensitive broadcast format as generally indicated in Table II.

TABLE II

POSITION CODE SENSITIVE
BROADCAST FORMAT

| QP | | | |
|---|---|---|---|
| QPH | QPL | OPERAND | |
| $/I_{15}$ — — $I_{12}/I_{11}$ — — $I_8/I_7/I_6$ — — — — — $I_0/$ | | | |
| $/D_{15}$ — — $D_{12}/D_{11}$ — — $D_8/D_7$ — — $D_4/D_3$ — — $D_0/$ | | | |
| (QPL=3) | (QPL=2) | (QPL=1) | (QPL=0) |

The "Set Activity Bits" instruction is issued in broadcast mode with a host processor specified position code mask in the high order four bits (QPH) of its 16 bit instruction word. As before, the low order seven bits of the instruction word contain the unique opcode specifying "the Set Activity Bits instruction". An intimately associated 16 bit data word is provided immediately after the instruction by the host processor. The data word is logically partitioned into four fields of four bits each. Each field preferably contains the four activity bits that are to be stored in four respective activity bit registers. The selection of a particular four bit data field for storage in the activity status register $98_2$ of a specific multiple parallel coprocessor 26 is determined upon receipt of the instruction and data by the micro-engine 100. Preferably, the micro-engine 100 examines the QPH field of the instruction and determines whether the value found matches that of the four high order bits of its own currently "Set Position" code. If the two values match, the value formed by the two least significant bits of the micro-engine's position code register $98_1$ is used as a pointer to one of the four data fields accompanying the instruction. The four activity status bits of the corresponding data field are then loaded into the micro-engine's activity status register $98_2$. However, if the micro-engine 100 did not obtain an exact match between the four bit position code value of the instruction and the value formed by the high order four bits of its position code register $98_1$, the instruction is effectively ignored and the micro-engine 100 does not alter the data stored by its activity status register $98_2$.

Much in the same way that the activity status bits define whether instructions are to be effectively executed with regard to specific display memory planes, the present invention also provides for the use of additional registers $98_n$ for respectively qualifying various preselected aspects of instruction execution by the micro-engine 100. For example, in a preferred embodiment of the present invention, a color bit register $98_3$ is utilized to define an active drawing color for each of the four memory planes of the display memory 32. That is, each display memory plane has a corresponding single bit color field for defining the current or default color memory value to be written into pixel corresponding memory locations of its corresponding display memory plane. Preferably, the color bit register is set in response to a "Set Color Bits" instruction issued in broadcast mode by the host processor 12 utilizing the position sensitive broadcast format given in Table II.

In accordance with the present invention, status bits within any of the registers 98 may be also utilized by the micro-engine 100 as a basis for further qualifying any action qualified by the status bits present in any other of the registers 98. Thus, in a preferred embodiment of the present invention, a video graphic function known conventionally as a seed fill operation is supported by the coprocessor array 25. This operation is performed to typically change the color of all pixels located within an arbitrarily shaped border defined by a known pixel search color value. As the seed fill operation is executed, beginning at a pixel location known to be within the border, the color value of an adjacent pixel memory location is obtained, compared against the search color value, and, if different, the drawing color register $98_3$ pixel color value is written back to the display memory. Where a pixel having the boundary color value is found, the direction of the search is effectively altered and the execution of the seed fill operation continued until the pixel area effectively defined by the boundary is filled As before, each coprocessor of the array 25 is provided with a search color value by the broadcast mode issuance of an appropriate position code sensitive broadcast format instruction. Accordingly, the present invention provides for a search color value register $98_4$ to store a single data bit per display memory plane as a respective search color value. That is, a data bit of the display memory color value accessed is compared against its respective display plane search color data bit in determining a search color value match.

In a preferred embodiment of the present invention, a listen data bit register $98_5$ is also provided. The preferably four data bits in this register again correspond to the respective display memory planes associated with a multiple parallel coprocessor 26. The listen bit register $98_5$ is preferably set in response to a set listen register instruction and associated data word. This instruction and data word are preferably broadcast issued by the host processor 12 in the position sensitive broadcast format of Table II. The preferred use of the listen data bits is in conjunction with the execution of the seed fill instruction. Significantly, the effect of the individual listen data bits on the operation of the micro-engine 100 is qualified by their corresponding activity status bits as stored by the status bit register $98_1$. Preferably, the micro-engine 100 examines the listen data bit for each display memory plane and, where reset, simply reports a pixel and search color value bit match for that particular display memory plane. Alternately, if the listen bit is set, then the the pixel and search color are compared and a match is reported only if they are identical.

There is, in the preferred embodiment of the present invention, a distinct difference in the result obtained for display memory planes where the activity status bit is reset and where both the activity status bit and listen data bit are set. The preferred effect of the activity status bit is to control whether write operations to the corresponding display memory plane will be allowed. Thus, in seed fill operations, the display memory plane bit values will change only for the planes that have their activeity bit set. In distinction, the effect of the listen status bit, when reset, is simply to exclude its corresponding display memory plane from participating in the pixel color matching operation.

Finally, the micro-engine 100 provides match-out (MO) and receives match-in (MI) control signals or control lines 116, 118, respectively. For purposes described in greater detail below, the match-out control signal is preferably provided on completion of execution of each data dependent instruction. Additionally, the match-out signal may be provided at a decision point during the execution of any instruction to specify a current decision point interim result as developed by the execution of the instruction upto the corresponding decision point. The match-in signal is sensed by the micro-engine 100 either to determine when to start execution of the next instruction or to receive an overriding decision point interim result for us in the further execution of the current instruction.

In order to explain the operation of the present invention, the additional functional blocks of the multiple parallel coprocessor 26 must be considered. As stated above for a preferred embodiment of the present invention, each multiple parallel coprocessor 26 preferably manages a respective display memory. Each display memory is preferably implemented as an array of dynamic random access memory (DRAM) cells. Accordingly, a DRAM refresh control block 102 is implemented in the multiple parallel coprocessor 26 for timing and controlling DRAM refresh cycles on the display memory 32. Similarly, the display memory 32 must be periodically accessed and provided to the video circuit 38 in order to refresh the video data shown. Accordingly, a video refresh controller 104 is also provided within the multiple parallel coprocessor 26.

In the performance of a DRAM or video refresh or any operation of the micro-engine 100 requiring an access of the display memory 32, the appropriate address and data signals are passed from the DRAM or video refresh controllers 102, 104 or micro-engine 100 to the internal bus 106 and then to a display memory access controller 110 before being provided onto the display memory address and data bus 50. Accesses of the display memory 32 by any of these three blocks 100, 102, 104 are, of necessity, mutually exclusive. Therefore, an arbitration control block 108 is provided to prioritize all display memory access operations. Preferably, the arbitration control block 108 receives DRAM refresh requests (RD) from the DRAM refresh controller 102, video refresh requests (RV) from the video refresh controller 104, and micro-engine access requests (RE) from the micro-engine 100. In turn, the arbitration control block 108 selectively provides respective acknowledge DRAM refresh (AD), acknowledge video refresh (AV) and acknowledge micro-engine (AE) control signals. Additionally, the arbitration control block 108 allows for the receipt of externally sourced display memory access request signals (XI) on a memory request control line 120 and a memory access control signal (XO) on the output control line 122. Each block or source of a request proceeds with its desired accesses of the display memory only on receipt of its respective acknowledge control signal. In accordance with a preferred embodiment of the present invention, the relative priority of the various requests submitted to the arbitration control block 108 are as shown in Table III.

TABLE III
| DISPLAY MEMORY ACCESS PRIORITY |
| --- |
| Highest: VIDEO REFRESH REQUEST |
| DRAM REFRESH REQUEST |
| EXTERNAL ACCESS REQUEST |
| Lowest: mENGINE ACCESS REQUEST |

Figure 3:
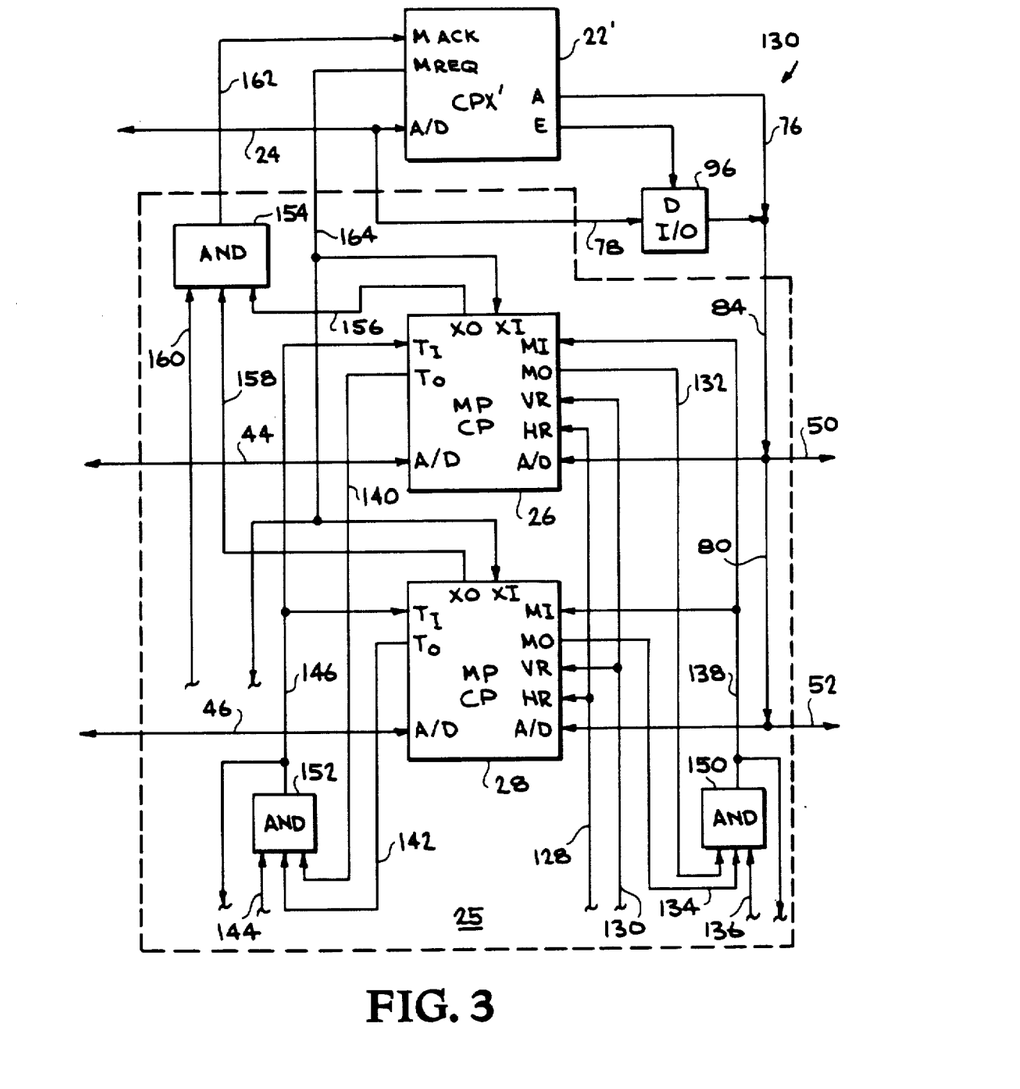
FIG. 3 is a detailed block diagram of the parallel coprocessor array interconnections between coprocessor architectures and a conventional coprocessor interfaced therewith as implemented in accordance with a preferred embodiment of the present invention.

FIG. 3 illustrates the inter-connection of multiple parallel coprocessor architecture within the array 25 in combination with a relatively conventional external device (CPX') 22', such as the host processor 12 or direct memory access controller 22. The various interconnections, in accordance with the present invention, permit essentially any number of the multiple parallel coprocessors 26, 28 to synchronously execute identical data dependent instructions at the optimum rate for the actual data affected, to effectively share interim, decision point result information, to identify a specific priority task to be performed by each of the multiple parallel coprocessors 26, 28 and to provide for the inclusion of the external device 22' within the priority scheme of the multiple parallel coprocessor array 25.

The significant advantage of the array of multiple parallel coprocessors 26, 28 synchronously executing identical instructions is that it becomes, in effect, a single instruction, multiple data machine. Consequently, the array 25 appears as a single entity to the host-processor 12 largely independent of the number of multiple parallel coprocessors actually implemented in the array and whose performance is largely limited only by the number of multiple parallel coprocessors provided in the array 25. The single instruction, multiple data operation of the multiple parallel coprocessor array 26, 28 must take into account the fact that each multiple parallel coprocessor 26, 28 will obtain varying execution times in the performance of data dependent instruction. In accordance with the preferred embodiment of the present invention, each multiple parallel coprocessor 26, 28 utilizes a first-in, first-out register file (not separately shown) for buffering instructions and data as received from the host processor 12. This effectively removes any possible burden on the host processor 12 as to when any specific instruction could be broadcast for the array of multiple parallel coprocessors 26, 28. However, the instruction execution integrity of the array of multiple parallel coprocessors 26, 28, operating as a single instruction, multiple data machine, requires that all of the multiple parallel coprocessors 26, 28 execute each data dependent instruction within a respective time frame, common to the entire array 25. In accordance with the present invention the data dependent instruction execution time frame is minimized to the longest period actually required by any individual multiple parallel coprocessor 26, 28 for its proper execution of the instruction. Thus, depending on the actual data operated on, every instruction is executed in the minimum period required by the array of multiple parallel coprocessors 26, 28 as a whole. This result is accomplished in the present invention by utilizing the match output signals as provided on the respective MO control lines 132, 134 to determine that the execution of the current instruction has been completed by the array 25. Each MO control line 132, 134 is provided as a respective input to an AND gate 150. The respective MO control lines from other multiple parallel coprocessors of the array 25 are indicated collectively by the single MO control line 136. Consequently, in accordance with the present invention, the AND gate 150 provides a composite execute complete signal on its output line 138 for distribution to each multiple parallel coprocessor 26, 28 of the array 25.

Figure 4:
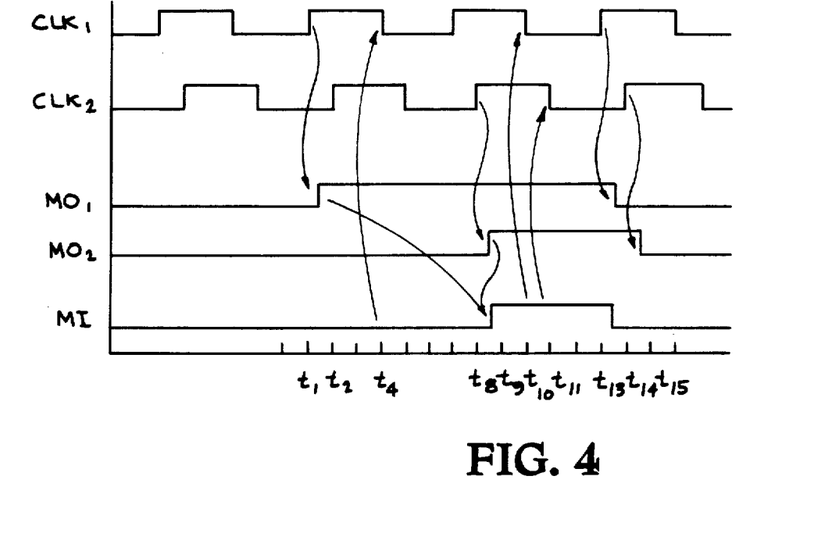
FIG. 4 is a simplified timing diagram illustrating the operation of the present invention in optimally maintaining instruction synchronization throughout the execution of the data dependent operations in accordance with a preferred embodiment with the present invention.

This instruction synchronization feature of the present invention is illustrated in greater detail in the timing diagram of FIG. 4. The $CLK_1$ and $CLK_2$ signals represent the respective internal execution synchronous clock signals of the two respective multiple parallel coprocessors 26, 28 illustrated in FIG. 3. Although the $CLK_1$ and $CLK_2$ signals may be ultimately derived from the same system clock source, a relative timing skew of the execution synchronous clock signals of each of the coprocessors, due to propogation delay and other factors, must be expected and tolerated.

As indicated, the first multiple parallel coprocessor 26 concludes the execution of an operation at $t_1$ and immediately thereafter provides its match-out signal ($MO_1$). The first multiple parallel coprocessor then begins sensing for the composite execution complete signal (MI) on its match-in control line 138. Thus, for example, during the second half of a $CLK_1$ cycle, such as beginning at $t_4$, the first coprocessor 26 determines that the composite execution complete control signal is not present. At the leading edge of the $CLK_2$ signal occurring at $t_8$ the second multiple parallel coprocessor 28 completes the execution of its instruction. An execution complete signal ($MO_2$) is provided on the match out control line 134 following $t_8$. Assuming that all other multiple parallel coprocessors of the array 25 have similarly completed the execution of their instructions, AND gate 150 provides the composite execution complete signal on the MI control line 138. The composite execution complete signal is sensed by the multiple parallel coprocessors 26, 28 at about $t_{10}$ and $t_{11}$, respectively. As a result, with the next rising clock edge of the $CLK_1$ and $CLK_2$ signals, the $MO_1$, $MO_2$ and execution complete signals are withdrawn and synchronous execution of the next instruction beings. Consequently, the present invention optimally provides for the essentially simultaneous beginning of instruction execution as soon as the last of the multiple parallel coprocessors of the array 25 has completed execution of its prior instruction independent of whether the instructions have fixed or data dependent execution periods.

Another requirement of a single instruction, multiple data machine is that the individual multiple parallel coprocessors 26, 28 effectively share interim results information at each instruction execution decision point as may occur for the proper execution of an instruction. That is, a single instruction may require a specific data condition to obtain commonly throughout the single instruction, multiple data machine. Efficient execution of this instruction requires communication among the individual multiple parallel coprocessors 26, 28 at each possible data condition decision point until the condition is satisfied for the entire machine.

The sharing of a data condition at a decision point during the execution of an instruction is implemented in a preferred embodiment of the present invention by utilizing the same match-out and match-in control signals as utilized in the above described instruction synchronization process. Further, in a preferred embodiment of the present invention, an example of an instruction requiring the sharing of decision point data condition information is the seed fill instruction. Specifically, the seed fill instruction requires a determination of whether the current pixel value corresponds to that of the specified boundary pixels Since the data corresponding to a complete single pixel lies across numerous bit planes and is, therefore, managed in part by each of the individual coprocessors of the array 25, each multiple parallel coprocessor 26, 28 is required to determine whether its respective portion of the boundary and the search pixel values match. However, only when all of the multiple parallel coprocessors of the array 25 obtain a match result can it be determined that a border pixel has been found.

Figure 5:
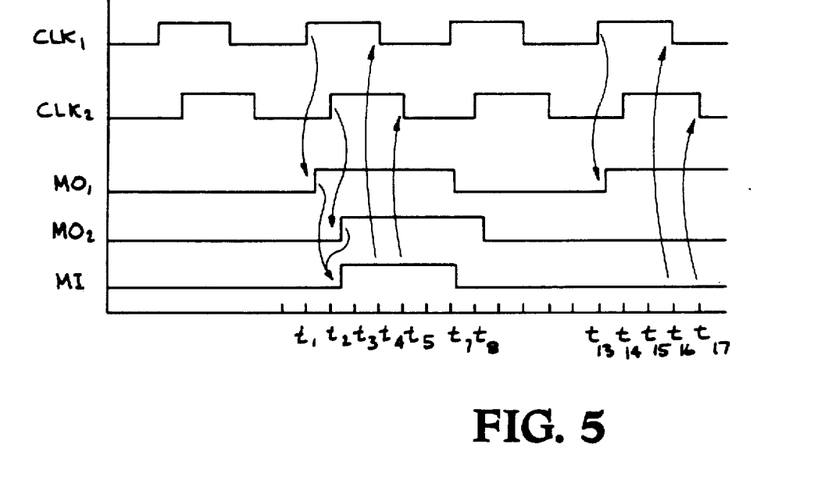
FIG. 5 is a simplified timing diagram illustrating the operation of the present invention in providing the the global exchange of interim result information in accordance with a preferred embodiment of the present invention.

The operation of the present invention, in determining a match condition, is illustrated in the timing diagram of FIG. 5. As before, the two $CLK_1$ and $CLK_2$ signals represent the potentially skewed internal execution clocks of two multiple parallel coprocessors 26, 28. The multiple parallel coprocessor 26 corresponding to $CLK_1$, as shown, has determined at $t_1$ that a match data condition exists, at least with respect to itself, by a comparison between the pixel value accessed from its display memory and the search pixel value provided by the host processor 12. Consequently, shortly after $t_1$, the first multiple parallel coprocessor provides its match out ($MO_1$) signal on the MO line 132 as the first step in obtaining a consensus determination of the array wide data condition.

Similarly, the second multiple parallel coprocessor 28 determines a match, at least with respect to itself, at about $t_2$. Accordingly, the second multiple parallel coprocessor 28 provides its $MO_2$ signal shortly thereafter. Assuming that all other multiple parallel coprocessors of the array 25 likewise detect respectively local matches, the AND gate 150 provides a composite match found signal on the composite result control line 138 to all of the multiple parallel coprocessors of the array 25. As before, during the second half of the $CLK_1$ and $CLK_2$ signal cycles, the multiple parallel coprocessors 26, 28 sense the state of the composite match found signal from the composite result control line 138. As a result, all of the multiple parallel coprocessors of the array 25 jointly determine that a full pixel value match has occurred. The individual microengines 100 within the multiple parallel coprocessors of the array 25 therefore conclude the decision point determination by continuing the execution of the seed fill operation in an identical manner as appropriate to the finding of a border pixel.

Alternately, only one or a few of the multiple parallel coprocessors of the array 25 may determine that respectively local matches exist. As shown in FIG. 5, a first multiple parallel coprocessor 26 may appropriately determine that a match, at least with respect to itself, exists at $t_{13}$. The second multiple parallel coprocessor 28, however, determines no local match. Thus, shortly after $t_{16}$ the coprocessors of the array 25 correctly observe the absence of a composite match found control signal. Consequently, the micro-engines 100 of the array 25 conclude this decision point determination by continuing the execution of the seed fill instruction in identical manners as appropriate for filling a pixel within the seed fill boundaries.

The utilization of the same MO control signals and AND gate 150 both for synchronization of data dependent instructions and the sharing of decision point data condition information is particularly achievable in the present invention due to the mutual exclusivity of instructions performing data dependent operations and those requiring the sharing of decision point interim result information. However, where such complete mutual exclusivity does not exist, each multiple parallel coprocessor of the array 25 may be readily implemented with respective sets of match-out and match-in control lines to allow instruction execution synchronization and the sharing of decision point information independently for the execution of any instruction. That is, in accordance with the present invention, the synchronization of instruction execution is readily extended to permit synchronization of the respective micro-engines 100 within the execution of an instruction. Thus, at any decision point, the micro-engines 100 are first synchronized to a common point in the execution of the current instruction. Then the respective decision point data conditions are combined by an external AND gate and shared among the coprocessors of the array 25. Execution of the data dependent instruction by each micro-engine 100 then proceeds to the next decision point or to completion in a manner consistent with the array wide consensus data condition.

Another aspect of the present invention regarding operation as a single instruction multiple data machine is an ability to appropriately deal with contention for access to the individual resources attached to the respective multiple parallel coprocessors 26, 28. As discussed above with regard to FIG. 2, a preferred embodiment of the present invention implements an arbitration control circuit 108 to resolve access contention directed to the display memory 32 as may occur between the DRAM refresh 102, video refresh 104 and micro-engine 100 blocks. However, access contention for each of the display memories 32, 34, 36 associated with the respective multiple parallel coprocessors of the array 25 must be handled in a like manner by each of the multiple parallel coprocessors 26, 28, 30, if operation is a single instruction multiple data machine is to be obtained. Otherwise, processing efficiency would significantly degrade as various portions of the array 25 simply wait for the completion of non-instruction execution related processing to be completed by any of the multiple parallel coprocessors 26, 28, 30 as necessary to maintain concurrency of instruction execution.

Accordingly, the present invention implements priority request/grant synchronization among all of the multiple parallel coprocessors of the array 25. This is accomplished by determining, through arbitration, a particular pending priority request to be granted by each of the multiple parallel coprocessors of the array 25. In a preferred embodiment of the present invention, priority request/grant occurs during each machine cycle to determine the actual priority operation to be performed during the next machine cycle. A machine cycle, in this preferred embodiment, is composed of six consecutive clock cycles. This machine-cycle arbitration allows the execution of an instruction to be temporarily halted for the one or more, coprocessor machine cycles required for a video refresh, for example. As soon as the micro-engine again becomes the highest priority requestor, the execution of the current instruction is resumed.

Priority arbitration by the entire array 25 begins immediately with the first clock cycle of each coprocessor array machine cycle. Arbitration selection is effectively concluded whenever each of the multiple parallel coprocessors has provided its priority request signal (TO) on a respective priority request control line 140, 142, and generically for other coprocessors of the array 25, line 144. The priority request control signals are provided as the respective inputs to a multiple input AND gate 152. As soon as all of the multiple parallel coprocessors of the array 25 have issued their respective priority requests for arbitration, the AND gate 152 provides a composite priority task selected (TI) control signal to each of the multiple parallel coprocessors of the array 25 via the AND gate output line 146. Identification of the particular priority task requested is determined from the specific clock cycle that the priority request control signal is provided onto a priority request line. In turn, output of the composite priority task selected control signal during any one clock cycle of a machine cycle specifically identifies the priority task granted by consensus of the entire array 25. However, the assignment of a particular cycle with any one of the priority requests is essentially arbitrary.

In a preferred embodiment of the present invention, the first four identification clock cycles correspond to priority task requests in the order given in Table III with the highest priority video refresh task request and grant being associated with the first clock cycle of a machine cycle.

Figure 6:
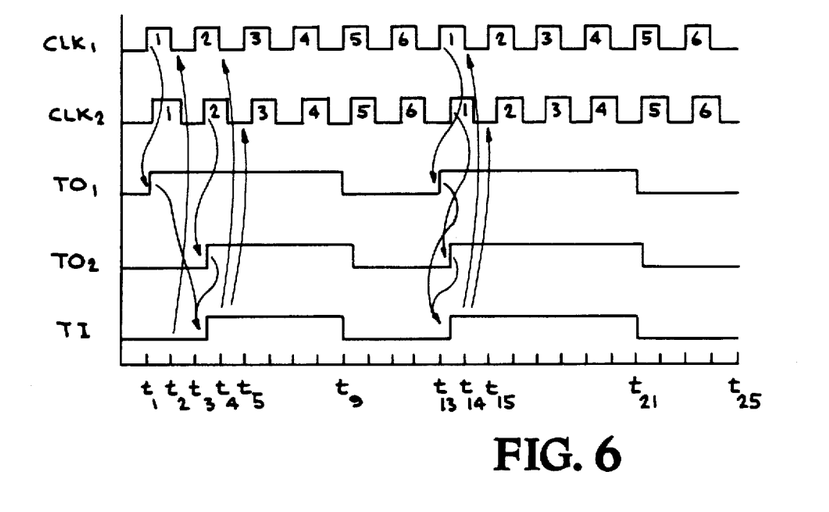
FIG. 6 is a simplified timing diagram illustrating the prioritization of coprocessor architecture subfunctions in accordance with a preferred embodiment of the present invention.

The operation of the priority task synchronization function of the present invention is illustrated by the timing diagram provided in FIG. 6. As shown, a first machine cycle begins at $t_1$ and a second begins at $t_{13}$. At $t_1$, a first multiple parallel coprocessor 26 issues a video refresh request by providing its $TO_1$ signal on its priority request line 140. A second multiple parallel coprocessor 28, however, has not yet determined a need to perform a video refresh. Instead, the second coprocessor 28 internally recognizes the need for a DRAM refresh and, accordingly, issues a priority task request at about $t_3$ corresponding to the beginning of the second clock cycle of the current machine cycle. While this circumstance is generally rare, the possibility of its occurrence is provided for in the present invention. Assuming that all other coprocessors of the array 25 are similarly issuing at least a DRAM refresh priority task request on their respective priority synchronization request lines, as generally indicated by the request line 144, the AND gate 152 provides its composite priority task selected signal on its output line 146

As before, each of the multiple parallel coprocessors of the array 25 sense the state of the priority task selected signal on control line 146 during the second half of each clock cycle following the issuance of their respective priority task request signals. Thus, the consensus arbitration result for the array 25 is actually sensed shortly after $t_4$. Consequently, the next machine cycle operation to be performed by the entire array 25 is determined to be a DRAM refresh. The present arbitration machine cycle concludes with the priority task request signals $TO_1$, $TO_2$ being withdrawn during the fifth clock cycle at about $t_9$.

At about $t_{15}$, priority arbitration begins for the next subsequent machine cycle while the coprocessors of the array 25 jointly perform the DRAM refresh operation. As indicated, the first multiple parallel coprocessor 26 reasserts is still pending priority task request for a video refresh. Also as shown, the second multiple parallel coprocessor similarly issues a request for the performance of a video refresh. Assuming that all other multiple parallel coprocessors of the array 25 are now also requesting video refreshes, the composite priority task selected control signal is provided shortly after $t_{13}$ and prior to the sensing thereof by each of the multiple parallel coprocessors of the array 25 during the second half of the first clock cycle. Consequently, a video refresh priority task is identified to all of the multiple parallel coprocessors of the array 25 as the consensus task to be performed in the next succeeding machine cycle The present invention specifically provides for the effective inclusion of conventional coprocessors, such as the coprocessor 22' shown in FIG. 3 or any logical equivalent, into the architecture of the multiple parallel coprocessor array 25. This is preferably accomplished by permitting a coprocessor 22' to enter into the competition for consensus selection as a priority task to be performed. In a preferred embodiment of the present invention, each multiple parallel coprocessor 26, 28 allows for the receipt of an external request (XI) and the provision of an external request grant (XO) signals. The conventional coprocessor 22' preferably provides a memory request control signal commonly to each of the external request inputs of the multiple parallel coprocessors of the array 25 via a external request control line 164. Based on the presence or absence of this external request signal, each multiple parallel coprocessor of the array 25 preferably internally arbitrates whether t provide its priority task request control signal during the third or any other appropriately corresponding clock cycle of an array arbitration machine cycle.

Consensus selection to grant an external request, as indicated by the provision of the composite priority task selected control signal during the third clock cycle, results in each of the multiple parallel coprocessors of the array 25 providing an external grant control signal on their respective external grant control lines 156, 158, 160. An AND gate 154, respectively receiving each of the external grant control signals, provides a composite external request acknowledge control signal on its composite external grant output line 162 to the conventional coprocessor 22'. Additionally, each of the multiple parallel coprocessors of the array 25 preferably place their address and data bus outputs, as coupled to their respective display memory address and data busses 50, 52, in a high impedance state. The conventional coprocessor 22' is thereby free to place its desired addresses and data onto the display memory address and data busses 50, 52 via the inter-connecting address and data busses 76, 84, 80. Thus, the conventional coprocessor 22' has full access to the display memories otherwise associated with the multiple parallel coprocessors of the array 25.

Figure 7:
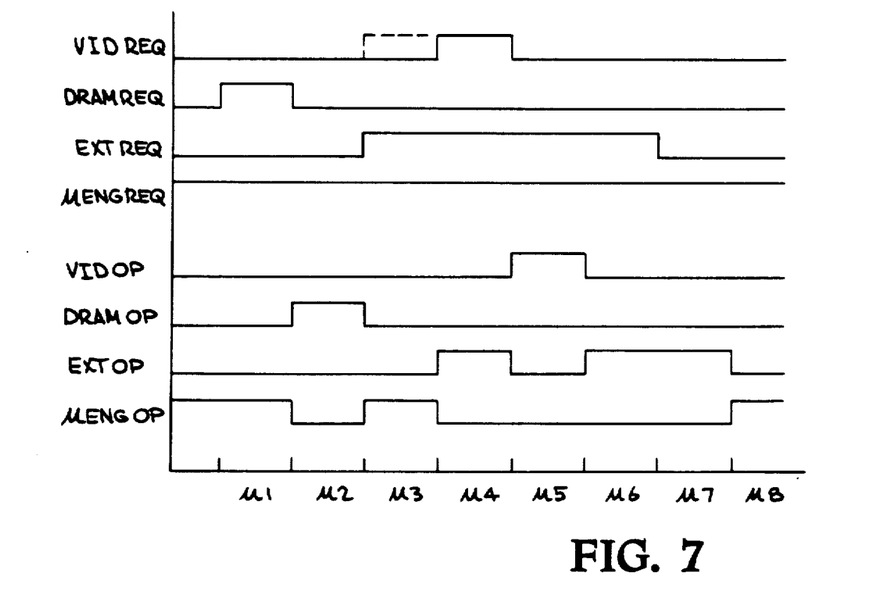
FIG. 7 is a simplified timing diagram illustrating the prioritization of coprocessor architecture functions in combination with an external device in accordance with a preferred embodiment of the present invention.

Preferably, the conventional coprocessor 22' maintains its memory request control signal on the external request control line 164 of the array 25 for whatever length of time access to the display memory of the array 25 is required. Referring now to FIG. 7, a sequence of consensus arbitrated priority tasks are shown as they occur during the operation of the coprocessor array 25 in accordance with the present invention. During a first machine cycle (M1), a consensus DRAM refresh request is granted priority for the next machine cycle. Thus, during machine cycle M2, a DRAM refresh operation is performed by each coprocessor of the array 25.

The only arbitration priority request during M2 is for a micro-engine access of the display memory. Since the micro-engine is the lowest priority task and in view of the first-in, first-out buffering of instructions, a micro-engine request is essentially always pending. Consequently, a micro-engine operation occurs during machine cycle M3.

As indicated in FIG. 7, a video refresh request occurs internally in at least one, but not all, of the coprocessors of the array 25 as described above in reference to FIG. 6. The consensus result of arbitration during machine cycle M3 is, therefore, the grant of an external request, since all of the coprocessors appear to have an external request pending. Access to the display memories of the array 25 by the external conventional coprocessor 22' occurs during machine cycle M4. Since multiple machine cycles are required by the conventional coprocessor 22', the external request is continuously submitted for arbitration. However, during M4 where all of the coprocessors of the array 25 issue a video refresh request, the array 25 recognizes the video refresh request as the consensus priority task to be performed during M5. Consequently, the array 25 withdraws the external request grant control signal and the conventional coprocessor 22' is forced to give up access to the display memory. That is, the address, data and control outputs of the conventional coprocessor 22' are placed in a high impedance state and the display memory is effectively returned to the array 25 for the performance of a video refresh during M5.

Arbitration during both M5 and M6 again results in the consensus grant of the still pending external request. Consequently, the composite external grant control signal is provided and the conventional coprocessor 22' is again allowed to obtain access to the display memory of the array 25. External operations on the display memory occur during both M6 and M7. During M7, however, the external request is no longer pending. Consequently, the micro-engine request becomes the consensus priority task with its corresponding operation being performed during M8.

Lastly, highly parallel, synchronous operation of the present invention is extended to allow for the matching of the consensus internal control functions of the array 25 to an external synchronization clock source. That is, in a preferred embodiment of the present invention, the specific timing of video control features are externally controllable by the application of vertical and horizontal reset control signals on external timing control lines 128, 130, as shown in FIG. 2. These external timing signals are respectively accepted by a video timing block within each coprocessor of the array 25, as shown in FIG. 3. The effect of these external reset control signals is to override the self-generated timing of the video refresh block 104. Thus, the start of both horizontal and vertical video refreshes occur synchronously with whatever device, external to the array 25, is the source of the external timing signals.

Thus, an extremely flexible multiple coprocessor computer architecture that specifically provides for both the independent and highly parallel operation of an array of coprocessors, as appropriate for optimal operation as a single instruction, multiple data machine, yet that requires little if any additional initialization or managerial support by any associated host processor has been described.

Naturally, many modifications and variations of the present invention are possible in light of the above teachings. For example, the AND gates could be completely replaced through the use of open collector type output gates for providing the match-out and similar signals. Also, the instruction functionallity of the coprocessors could be realized to perform numberical computations on data stored in the respective memory planes. An alternate instruction functionallity could be to perform virtual-to-real data address conversions in support of a multiply partitioned data area, mass storage device. Accordingly, it is to be understood that, within the scope of the appended claims, the present invention may be practiced otherwise than is specifically described above.

We claim:

1. A coprocessor for use in a computer system having a host processor, a plurality of said coprocessors and a like plurality of data memories wherein each of said plurality of coprocessors is coupled to said host processor for the receipt of instructions, control signals and data and each of said plurality of coprocessors is coupled to a respective one of the data memories, said coprocessor comprising:
    (a) means, responsive to the control signals, for enabling said coprocessor to respond to instructions and data in one of a plurality of instruction execution modes, said enabling means distinguishing between instruction execution modes wherein said coprocessor responds to instructions and data singularly with respect to others of said coprocessors and wherein said coprocessor responds to instructions and data in parallel with others of said plurality of coprocessor; and
    (b) means, coupled to said host processor for receiving instructions and data, for executing instructions received with respect to data provided with the instruction and as present in the respective one of the data memories, said executing means including:
        (i) means for storing data, said executing means being responsive to the data stored by said storing means and the instruction execution mode enabled by said enabling means for qualifying the execution of instructions by said executing means; and
        (ii) means for communicating interim result information with others of said plurality of coprocessors when executing an instruction in parallel with others of said plurality of coprocessors, said communication means providing a interim result control signal upon reaching a decision point in the execution of an instruction indicative of the interim results of the execution of said instruction and being responsive to a consensus control signal representing the consensus result of said plurality of coprocessors executing said instruction in parallel at said decision point in the execution of said instruction.

2. The coprocessor of claim 1 wherein said communicating means is responsive to said executing means and independent of the host processor.

3. The coprocessor of claim 2 wherein said storing means comprises register means for storing a plurality of predetermined qualification data including coprocessor identification data for establishing the relative identify of said coprocessor among said plurality of coprocessors.

4. The coprocessor of claim 1 or 3 wherein said communicating means comprises:

(a) means for providing a control signal in response to a predetermined event including a current instruction complete controls signal and a decision point control signal; and
    (b) means for receiving a consensus control signal indicative of a predetermined event result including a current instruction complete control signal and a consensus interim result control signal.

5. The coprocessor of claim 4 wherein said providing means further provides a prioritized task request control signal in response to a predetermined event occurrence and said receiving means further provides for receiving a prioritized task request control signal.

6. The coprocessor of claim 5 wherein said communicating means further comprises:
    (a) means for receiving an external request control signal for prioritization; and
    (b) means for providing an external grant control signal to acknowledge consensus acceptance of said external request control signal.

7. A coprocessor system for supplementing a host processor wherein said host processor provides addresses and exchanges data wqith said coprocessor system, said coprocessor system comprising:
    a plurality of coprocessors coupled in common to said host processor for receiving instructions and accompanying data as provided by said host processor, each said coprocessor including:
        (i) means for executing instructions including means for qualifying the execution of instructions; and
        (ii) means, exclusive of said host processor, for coordinating the execution of a data dependent instruction by each of said plurality of coprocessors, said coordinating means providing an interim result control signal at a data dependent decision point in the execution of said data dependent instruction and providing or receipt of a consensus include result control signal indicative of the combination of said interim result control signals of all of said coprocessors.

8. The coprocessor system of claim 7 wherein each said coprocessor further comprises means, responsive to said host for receiving and decoding addresses to provide any of a set of coprocessor selection signals and wherein said decoding means provides each said coprocessor selection signal in response to a corresponding address as provided by said host processor, whereby each of said plurality of coprocessors is responsive to at least one unique address and to at least one address in common with others of said plurality of coprocessors.

9. The coprocessor system of claim 7 wherein each said coordinating means provides a respective coordination request control signal and receives a coordination acknowledged control signal, and wherein said coprocessor system further comprises logic means, responsive to said respective coordination request control signals, for providing said coordination acknowledged control signal based on the logical combination of respective said coordination request control signals.

10. The coprocessor system of claim 9 wherein each said coordinating means provides its respective said coordination request control signal on completion of the execution of an instruction, said coordinating means including executing means until said coordination acknowledge control signal is received.

11. The coprocessor system of claim 9 wherein each said coordinating means is responsive to its corresponding instruction executing means for receiving a decision point determination signal and wherein each said coordinating means, in response to said decision point determination signal, selectively provides its respective said coordination request control signal at a decision point during the execution of an instruction.

12. The coprocessor system of claim 11 wherein each said coordinating means includes means, responsive to said coordination acknowledged control signal, for providing a decision point consensus signal to its corresponding instruction executing means.

13. The compressor system of claim 9 wherein each said coprocessor further includes a memory array and means for accessing said memory array, said assessing means competing with said executing mans for periodic access to said memory array, and means, responsive to access requests source by said accessing means and said executing means, for arbitrating between said access requests, and wherein said coordinating means is responsive to said arbitrating means for providing said coordination request control signal beginning at one of a number of predetermined time periods, the one of said predetermined time periods being determined by said arbitrating means, following the initiation a predetermined operating cycle.

14. The coprocessor system of claim 13 wherein said arbitration means is responsive to a plurality of access requests including said access requests sourced by said accessing means and said executing means and wherein each said predetermined time period logically corresponds to a respective one of said access requests and wherein said coordinating means of each said coprocessor includes means, responsive to said coordination acknowledged control signal, for providing a consensus access request select signal to means.

15. The coprocessor system of claim 14 wherein each said coordinating means includes means for receiving an external coordination request control signal and for providing a respective external coordination acknowledge control signal.

16. The coprocessor system of claim 15 wherein said external coordination request control signal is provided commonly to said coordinating means and wherein said coprocessor system further comprises external acknowledge logic means for providing an external enable control signal from the logical combination of respective said external coordination acknowledge control signals.

17. The coprocessor system of claim 16 wherein said each said coordinating means provides said external coordination request control signal to its respective arbitrating means for arbitration as one of said plurality of access requests, and wherein said coordinating means provides its respective external coordination acknowledge control signal on selection of the predetermined time period corresponding to the access request identified by said external coordination request control signal.

18. The coprocessor system of claim 8 wherein each said coprocessor is responsive to a respective address for receiving instructions and for transferring data to or from said host processor and wherein all said coprocessors are responsive to a common address for receiving instructions and data from said host processor.

19. The coprocessor system of claim 18 wherein all said coprocessors are responsive to an instruction issued by said host processor to said address in common for transferring data to said host processor, and wherein each coprocessor of said coprocessor system includes a plurality of memory planes, means for storing a coprocessor identification value and a memory plane selected control value for controlling access to said plurality of memory planes by said executing means and means for selecting data from said plurality of memory planes as qualified by said memory plane select control value for simultaneous transfer from respective ones of said coprocessors to said host processor.

20. A parallel coprocessor array for use in a computer system as an adjunct to a host processor, said parallel coprocessor array providing for the primary management of data resources of said computer system, said parallel coprocessor array being coupled to said host processor for the receipt of instructions and accompanying data and for providing data to said host processor, said parallel coprocessor array comprising:

(a) a first parallel coprocessor and a first data resource, said first parallel coprocessor including means for executing instructions with respect to said first data resource and means for synchronizing the execution of instructions with the execution of instructions by other coprocessors of said parallel coprocessor array said first executing means includes first means for providing a first instruction synchronization signal, for receiving a consensus instruction synchronization signal and for halting the execution of instructions by said first executing means for the period between providing said firs instruction synchronization signal and receiving said consensus instruction synchronization signal; and (b) a second parallel coprocessor and a second data resource, said second parallel coprocessor including means for executing instructions with respect to said second data resource and for synchronizing the execution of instructions with the execution of instructions by other coprocessors of said parallel coprocessor array, said second executing means includes second means for providing a second instruction synchronization signal, for receiving an consensus instruction sychronization signal and for halting the execution of instructions by said second executing means for the period between providing said second instructions synchronization signal and receiving said consensus instruction synchronization signal, said first and second parallel coprocessors being interconnected so that the simultaneous provision of said first and second instruction synchronization signals provides said consensus instruction synchronization signal and wherein said first and second parallel coprocessors provide for instruction synchronization at the completion of an instruction.

21. The parallel coprocessor array of claim 20 wherein:

(a) said first executing means includes first means for providing a first decision point value signal, for receiving a consensus decision point value signal and for altering the execution of the instruction currently being executed by said first executing means in response to said consensus decision point value signal;

(b) said second executing means includes second means for providing a second decision point value signal, for receiving an consensus decision point value signal and for altering the execution of the instruction currently being executed by said second executing means in response to said consensus decision point value signal; and (c) said first and second parallel coprocessors are interconnected so that said first and second decision point value signals are combined to provide said consensus decisions point value signal.

22. The parallel coprocessor array of claim 21 wherein said first and second decision point value signals are provided at predetermined like execution decision points in the execution of like instructions by said first and second parallel array coprocessors.

23. The parallel coprocessor array of claim 22 wherein, during the execution of predetermined like instructions, the execution decision points of each instruction are synchronized at a predetermined execution decision point by the provision of said first and second synchronization signals and subsequent receipt of said consensus synchronization signal, whereupon said first and second decision point value signals are provided by said first and second parallel coprocessors.

24. The parallel coprocessor array of claim 23 wherein:

(a) the management of said first and second data resources is performed respectively by said first and second parallel coprocessors through the execution of a management fuction in addition to the execution of instructions, the execution of said management function and respective instructions being executed as respective tasks during corresponding successive processor cycles;

(b) said first parallel coprocessor includes first means for arbitrating between said management function and the execution of instructions for the selection of a task to be granted management access to said first data resource; and (c) said second parallel coprocessor includes second means for arbitrating between said management function and the execution of instructions for the selection of a task to be granted management access to said second data resource.

25. The parallel coprocessor array of claim 24 wherein:

(a) said first arbitrating means includes first means for providing a first priority task identification signal, for receiving a consensus priority task identification signal and for enabling the selected consensus priority task upon completion of the current task;

(b) said second executing means includes second means for providing a second priority task identification signal, for receiving a consensus priority task identification signal and for enabling the selected the consensus priority task upon completion of the current task; and (c) said first and second parallel coprocessors are interconnected so that said first and second priority task identification signals are combined to provide said consensus priority task identification signal.

26. The parallel coprocessor array of claim 25 wherein said first and second priority task identification signals are respectively provided begining at one of a number of predetermined time periods following the begining of the current task, each said predetermined time period corresponding to a prioritized managment function including the execution of instructions.

27. The parallel coprocessor array of claim 26 wherein:

(a) said first arbitrating means includes first means for receiving an external task priority request signal, for providing a first external priority task acknowledge signal and for disabling access to said first data resource by said first parallel coprocessor during any task cycle that said external task priority request is the selected consensus priority task; and (b) said second arbitrating means includes second means for receiving an external task priority request signal, for providing a second external priority task acknowledge signal and for disabling access to said second data resource by said second parallel coprocessor during any task cycle that said external task priority request is the selected consensus priority task 28. A parallel coprocessor for use in a coprocessor array supplementing a host processor in a computer system, said coprocessor array providing for the management of one or more resources, said coprocessor array including two or more identicle parallel coprocessors, each said parallel coprocessor being coupled to said host processor for the receipt of instructions and accompanying data and for providing data to said host processor, a data resource being primarily associated with each parallel coprocessor of said coprocessor array, said parallel coprocessor comprising:

(a) means for executing instructions as a first function directed to the management of the data resource associated with said parallel coprocessor;

(b) means for performing a second function directed to the management of the data resource associated with said parallel coprocessor; and (c) means for arbitrating between said first and second functions for the selection of a function to be granted management access to the data resource associated with said parallel coprocessor.

* * * * *

UNITED STATES PATENT AND TRADEMARK OFFICE
CERTIFICATE OF CORRECTION

PATENT NO. : 4,809,169
DATED : February 28, 1989
INVENTOR(S) : Sfarti, A. et al

It is certified that error appears in the above-identified patent and that said Letters Patent is hereby corrected as shown below:

Column 18, Line 23: Delete "wqith" and insert therefor --with--
Column 18, Line 39: Delete "include" and insert therefor --interim--
Column 19, Line 17: Delete "source" and insert therefor --sourced--
Column 20, Line 29: Delete "firs" and insert therefor --first--

Signed and Sealed this

Sixth Day of March, 1990

Attest:

JEFFREY M. SAMUELS

Attesting Officer

Acting Commissioner of Patents and Trademarks